United States Patent
Brandstetter

(10) Patent No.: US 10,397,626 B2
(45) Date of Patent: Aug. 27, 2019

(54) SYSTEMS AND METHODS FOR PROVIDING ACCESS TO RIGHTS HOLDER DEFINED VIDEO CLIPS

(71) Applicant: Jeffrey D. Brandstetter, San Francisco, CA (US)

(72) Inventor: Jeffrey D. Brandstetter, San Francisco, CA (US)

(73) Assignee: IPAR, LLC, San Francisco, CA (US)

( * ) Notice: Subject to any disclaimer, the term of this patent is extended or adjusted under 35 U.S.C. 154(b) by 0 days.

(21) Appl. No.: 14/202,480

(22) Filed: Mar. 10, 2014

(65) Prior Publication Data
US 2014/0282680 A1 Sep. 18, 2014

Related U.S. Application Data

(60) Provisional application No. 61/789,719, filed on Mar. 15, 2013.

(51) Int. Cl.
| | |
|---|---|
| *G11B 27/19* | (2006.01) |
| *G06Q 30/02* | (2012.01) |
| *G06F 21/10* | (2013.01) |
| *H04N 21/258* | (2011.01) |
| *H04N 21/8355* | (2011.01) |
| *H04N 21/845* | (2011.01) |
| *H04L 29/06* | (2006.01) |

(52) U.S. Cl.
CPC ... *H04N 21/25875* (2013.01); *H04N 21/8355* (2013.01); *H04N 21/8455* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 7,466,823 B2* | 12/2008 | Vestergaard et al. | 380/227 |
| 8,209,729 B2* | 6/2012 | Phillips | G06Q 30/02 725/114 |
| 2002/0156691 A1* | 10/2002 | Hughes et al. | 705/26 |
| 2003/0131353 A1* | 7/2003 | Blom et al. | 725/25 |
| 2004/0010602 A1* | 1/2004 | Van Vleck | G06Q 30/06 709/229 |
| 2004/0128324 A1* | 7/2004 | Sheynman | G06F 21/10 |
| 2007/0198468 A1* | 8/2007 | Berger | G06F 17/30017 |
| 2007/0266399 A1* | 11/2007 | Sidi | H04N 5/4401 725/42 |
| 2008/0082448 A1* | 4/2008 | Meijer et al. | 705/59 |
| 2008/0228733 A1* | 9/2008 | Davis et al. | 707/3 |
| 2008/0255994 A1* | 10/2008 | Schnell | G06Q 30/02 705/52 |
| 2009/0094652 A1* | 4/2009 | Al Adham et al. | 725/103 |
| 2010/0112540 A1* | 5/2010 | Gross et al. | 434/351 |

(Continued)

*Primary Examiner* — Nasser M Goodarzi
*Assistant Examiner* — Terrika Peterson
(74) *Attorney, Agent, or Firm* — Jones Day

(57) ABSTRACT

Computer-implemented systems and methods are provided for providing access to a portion of a video to a requesting user. For example, a computer can receive an identification of a video, a starting point of a clip within the video, and an ending point of the clip within the video from a rights holder. The computer can define a video clip based on the identified video, the starting point, and the ending point. The computer can also provide a link by which a requesting user is provided access to the video clip.

31 Claims, 4 Drawing Sheets

(56) References Cited

U.S. PATENT DOCUMENTS

| | | | |
|---|---|---|---|
| 2010/0305959 A1* | 12/2010 | Johnson | G06F 17/30017 |
| | | | 705/1.1 |
| 2011/0078041 A1* | 3/2011 | Barker | G06F 21/10 |
| | | | 705/26.25 |
| 2012/0123831 A1* | 5/2012 | King et al. | 705/14.7 |
| 2012/0284345 A1* | 11/2012 | Costenaro | G06Q 10/107 |
| | | | 709/206 |
| 2013/0347056 A1* | 12/2013 | Kuhlman | H04L 29/06 |
| | | | 726/1 |
| 2014/0067686 A1* | 3/2014 | Tuttle | G06Q 30/06 |
| | | | 705/51 |
| 2014/0282680 A1* | 9/2014 | Brandstetter | 725/25 |
| 2015/0325268 A1* | 11/2015 | Berger | G11B 27/19 |
| | | | 386/248 |

* cited by examiner

SYSTEMS AND METHODS FOR PROVIDING ACCESS TO RIGHTS HOLDER DEFINED VIDEO CLIPS

This application claims priority to U.S. Provisional Application No. 61/789,719, entitled "Systems and Methods for Providing Access to Rights Holder Defined Video Clips," filed Mar. 15, 2013, the entirety of which is herein incorporated by reference.

FIELD

The technology described herein relates generally to access control and more specifically to access control of videos.

BACKGROUND

Video clips are commonly made available over distribution channels such as the Internet. For example, a video clip may be submitted to content distributors such as YouTube where it is hosted and made accessible. Typically, access to the video clip is either without restriction or is limited to a select population (e.g., subscribers). In either case, a viewer who obtains access to the video clip can view the clip in its entirety. However, such a limited access control paradigm may be unsuitable for certain situations. For example, a rights holder to a video clip may only wish to make a portion of the video clip accessible to a particular audience, or make different portions of the video clip accessible to different audiences. Thus, a more flexible and sophisticated approach for controlling access to a video clip is needed.

SUMMARY

In accordance with the teachings herein, computer-implemented systems and methods are provided for providing access to a portion of a video to a requesting user. For example, a computer can receive an identification of a video, a starting point of a clip within the video, and an ending point of the clip within the video from a rights holder. The computer can define a video clip based on the identified video, the starting point, and the ending point. The computer can also provide a link by which a requesting user is provided access to the video clip.

DETAILED DESCRIPTION

Figure 1:
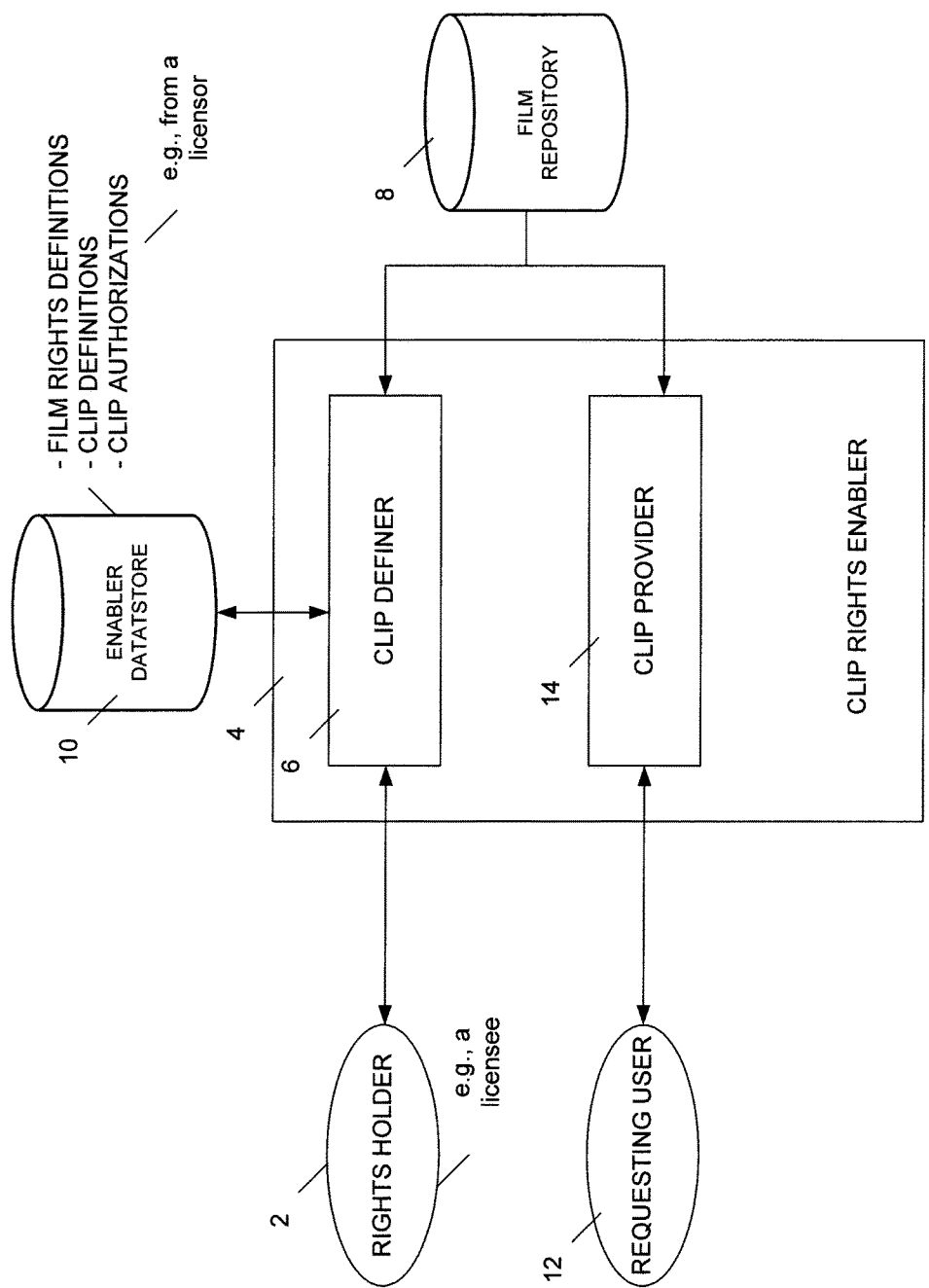
FIG. 1 depicts a computer-implemented environment for providing access to a portion of a video to a requesting user.

FIG. 1 is a block diagram depicting a computer-implemented clip rights enabler. A rights holder 2, such as a content creator or other party who has rights to modify the content, which in some instances may include a purchaser of a personal copy of the content, accesses a clip rights enabler 4 to generate a clip of a larger film. For example, a rights holder 2, such as a marketing executive, may wish to generate a promotion for a movie that includes a clip of the movie. The rights holder 2 accesses the clip rights enabler 4 to identify the boundaries of the clip in the larger film and to facilitate distribution of the clip. The rights holder 2 accesses the clip rights enabler 4 and uses a clip definer 6 to define the film clip. The rights holder 2 identifies the film from which the clip is to be taken, and that film is accessed from a film repository 8. The clip definer 6 may provide the selected film for viewing by the rights holder 2 to aid in definition of the boundaries of the clip. The rights holder 2 identifies a starting point of the desired clip and an ending point of the desired clip. For example, the rights holder 2 may type a time stamp for each of the starting and ending point or may identify the starting and ending points via a graphical user interface (e.g., by selecting a point on a timeline associated with the selected film). Upon identification of the selected video, the starting point, and the ending point, the clip definer 6 defines the video clip by creating a record in an enabler data store 10. That record identifies the video clip and the boundaries of that video clip, and the existence of that data record facilitates viewing the defined video clip by a requesting user 12.

A requesting user 12 interacts with a clip provider 14 of the clip rights enabler 2 to view a video clip. The requesting user 12 may be directed to the clip provider 14 via a variety of mechanisms. For example, upon definition of the clip by the rights holder 2, the rights holder 2 may be provided a link that the rights holder 2 can distribute to the requesting user 12 and others to whom the rights holder 2 wishes to enable access to the video clip. Such a link can be forwarded to others by e-mail, uploaded to a social media site, displayed on a website, or otherwise published and delivered. In other implementations, the link is automatically distributed (e.g., to users on an e-mail mailing list) upon definition of the video clip. Upon clicking the link or otherwise indicating interest in viewing the video clip, the requesting user 12 is provided access to the video clip. In one example, the requesting user's access may be limited to the bounds of the video clip definition of the rights holder 2. For example, the requesting user 12 may be prevented from viewing portions of the larger film before the defined starting point or after the defined ending point. Such a limitation on viewing may be accomplished in a variety of ways, such as by creating a film clip file that only includes the defined film clip and providing the film clip file to the requesting user 12. The limitation could also be enforced using, or making the film clip viewable only on, a video player that limits viewing of the film to the time period between the starting point and the ending point.

In some implementations, the rights holder 2 may be required or may wish to provide limitations on the ability to view a film clip. In one example, the rights holder 2 may be a teacher who has limited rights to create film clips to a film for their students to view (e.g., a teacher may be permitted to mark a section of a documentary for later call-up by his class). To prevent unauthorized viewing, the teacher rights holder 2 may attach a clip authorization to a defined film clip identifying parties who are permitted or prohibited from viewing a defined film clip. Such clip authorizations may be stored in the enabler data store 10. The clip authorizations may identify individual users or groups of users who are permitted or denied permission to watch a video clip. In one example, a clip provider 14 authenticates a requesting user 12 and compares the authenticated identity of the requesting user 12 to the clip authorizations attached to a film clip to determine whether the requesting user 12 should be provided access to the film clip.

In another implementation, a rights holder's ability to create and distribute video clips may be limited by a super rights holder. For example, a rights holder 2 may be a purchaser of a film, while a super rights holder may be a distributer of the film. The distributer super rights holder may be comfortable with the rights holder distributing limited clips of the film to increase interest in the film. However, the super rights holder may wish to limit those clip definition rights. For example, the super rights holder may limit the number of clips that a particular rights holder may make or the time length of clips that the particular rights holder may make. Additionally, the super rights holder may limit from which portions of the film a film clip may be defined (e.g., the super rights holder may not want film clips of the film's climax to be distributed that would spoil a major plot reveal). Such super rights holder definitions may be stored in the enabler data store 10 as film rights definitions. Such super rights holder rules may be enforced by authenticating the identity of the rights holder 2, determining whether the rights holder has sufficient permission to define the video clip of the video at all (e.g., a non-purchaser of the video may not have any rights, while a purchaser of the video may have limited clip defining ability), and determining whether the rights holder 2 has sufficient rights to define the clip that the rights holder 2 has requested based on the film rights definition. In one example, a party may gain rights to define clips by performing a required action, where upon performance of that action, the party receives the right to define clips from a superior rights holder. For example, upon payment of a fee, a party may receive the right to define clips from a purchaser or other super rights holder. In another example, a content purchaser can receive clip defining rights from a super rights holder in exchange for joining a website, paying an additional fee, or performing another required action.

In addition to defining the bounds of a video clip, a rights holder 2 may perform other operations that affect a video clip to which the requesting user 12 is provided access. For example, the rights holder 2 may annotate the clip, such as by identifying a run-time of a clip, an identification of the context of the clip (e.g., "Start of Act 2, Scene 3"), overlaying graphical elements on the video, etc. Such annotations can be stored in the enabler data store 10 and used to augment the viewing experience of the requesting user 12.

While the examples described herein are directed to definition of video clips, the systems and methods apply to other content types as well. For example, a rights holder may delineate and distribute clips of content that is audio, video, still image, or hybrid combinations thereof.

Figure 2:
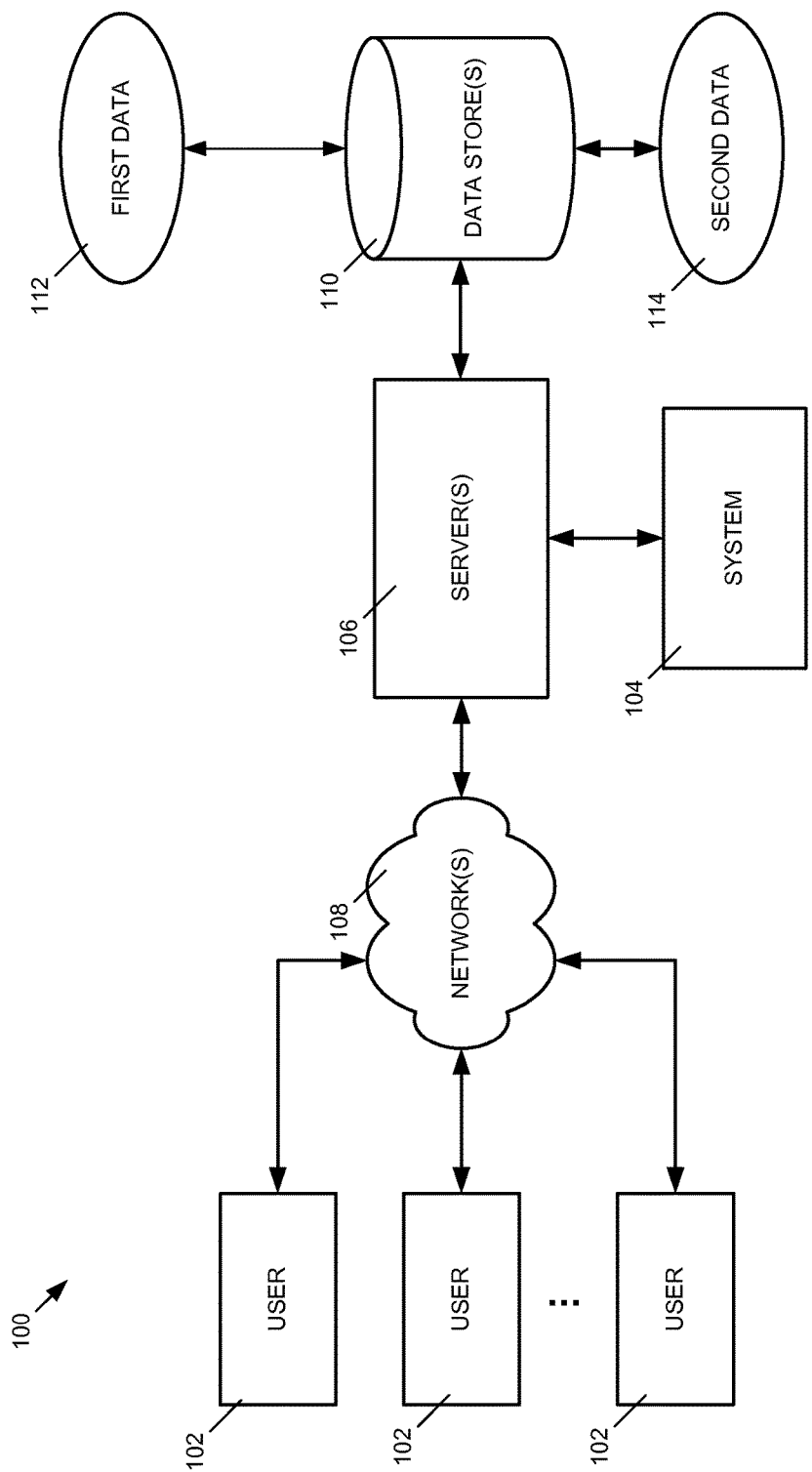
FIG. 2 depicts a computer-implemented environment for a user to access a clip rights enabler through a network.

FIG. 2 depicts at 100 a computer-implemented environment wherein users 102 can interact with a system 104 hosted on one or more servers 106 through a network 108. The system 104 contains software operations or routines. The users 102 can interact with the system 104 through a number of ways, such as over one or more networks 108. One or more servers 106 accessible through the network(s) 108 can host system 104. It should be understood that the system 104 could also be provided on a stand-alone computer (e.g., desktop, laptop, tablet device, mobile device) for access by a user.

Figure 3A:
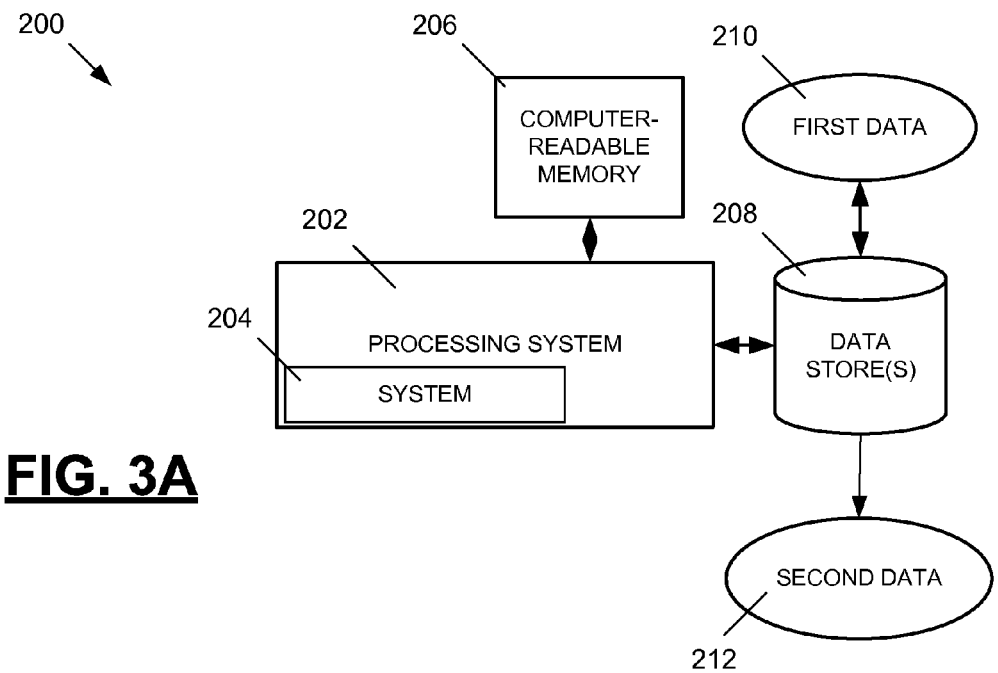
FIGS. 3A, 3B, and 3C depict example systems for use in implementing a clip rights enabler.
Figure 3B:
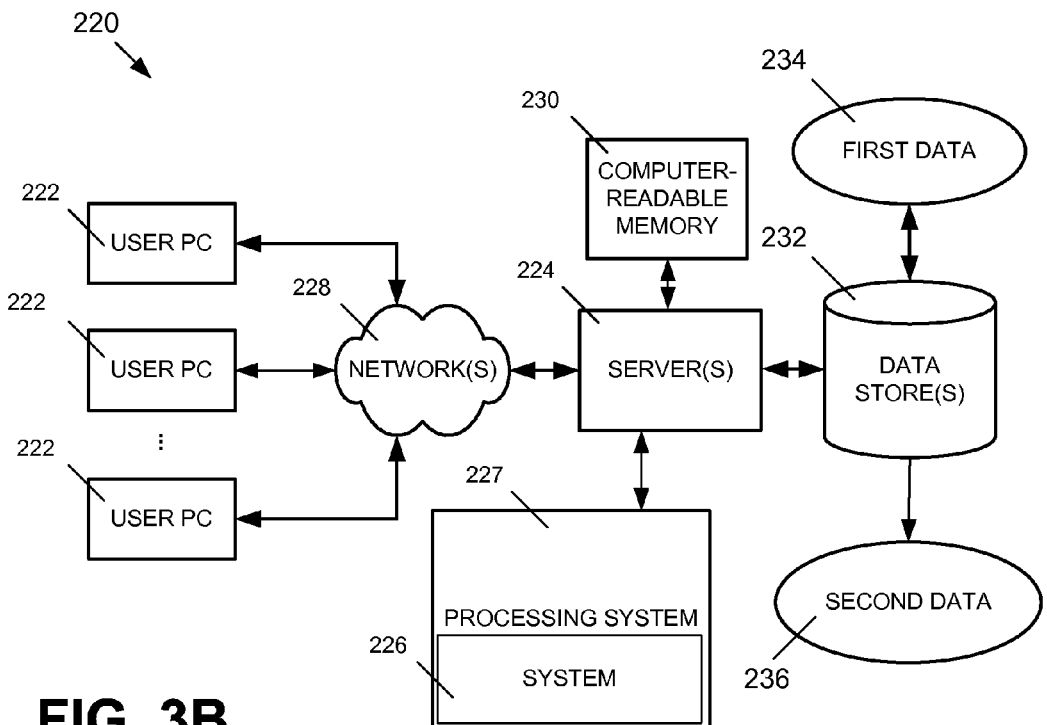
Figure 3C:
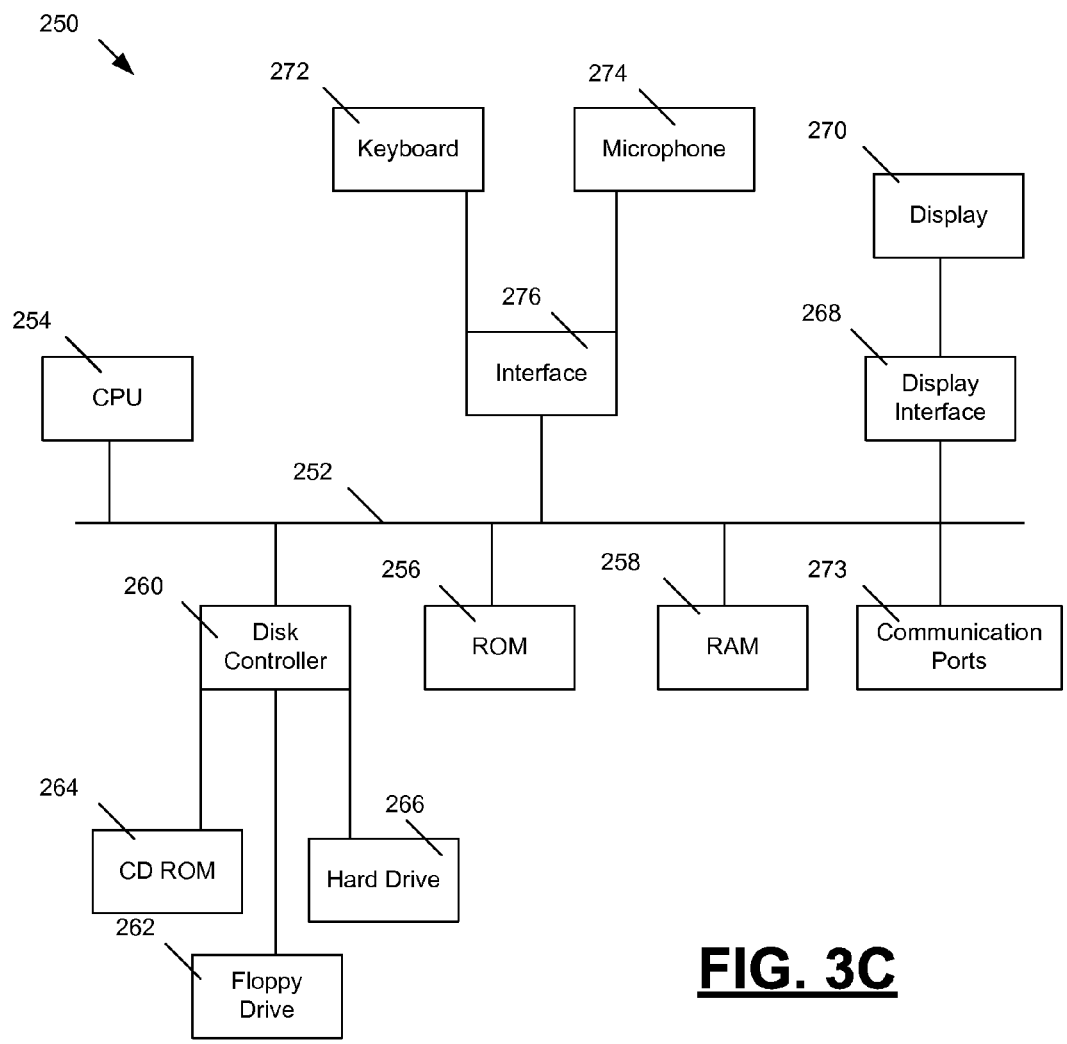

FIGS. 3A, 3B, and 3C depict example systems for use in implementing a system. For example, FIG. 3A depicts an exemplary system 200 that includes a standalone computer architecture where a processing system 202 (e.g., one or more computer processors) includes a system 204 being executed on it. The processing system 202 has access to a computer-readable memory 206 in addition to one or more data stores 208. The one or more data stores 208 may contain first data 210 as well as second 212.

FIG. 3B depicts a system 220 that includes a client server architecture. One or more user PCs 222 accesses one or more servers 224 running a system 226 on a processing system 227 via one or more networks 228. The one or more servers 224 may access a computer readable memory 230 as well as one or more data stores 232. The one or more data stores 232 may contain first data 234 as well as second data 236.

FIG. 3C shows a block diagram of exemplary hardware for a standalone computer architecture 250, such as the architecture depicted in FIG. 3A, that may be used to contain and/or implement the program instructions of system embodiments of the present invention. A bus 252 may serve as the information highway interconnecting the other illustrated components of the hardware. A processing system 254 labeled CPU (central processing unit) (e.g., one or more computer processors), may perform calculations and logic operations required to execute a program. A processor-readable storage medium, such as read only memory (ROM) 256 and random access memory (RAM) 258, may be in communication with the processing system 254 and may contain one or more programming instructions. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 260 interfaces one or more optional disk drives to the system bus 252. These disk drives may be external or internal floppy disk drives such as 262, external or internal CD-ROM, CD-R, CD-RW or DVD drives such as 264, or external or internal hard drives 266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258. Preferably, the processor 254 may access each component as required.

A display interface 268 may permit information from the bus 256 to be displayed on a display 270 in audio, graphic, or alphanumeric format. Communication with external devices may optionally occur using various communication ports 273.

In addition to the standard computer-type components, the hardware may also include data input devices, such as a keyboard 272, or other input device, such as a microphone 274, remote control, pointer, mouse and/or joystick.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of providing access to a portion of a video to a requesting user, comprising:
   providing, by a server system comprising one or more hardware servers using one or more data processors, a media content over a network to a licensee that is granted permission to define media content clips from the media content;
   receiving, at the system, from the licensee, over the network, a starting point within the media content and an ending point within the media content to define a media content clip located between the starting point and the ending point; and
   determining, by the system, based on rights definitions contained in a rights enabler data store of the system whether the licensee is permitted to distribute the media content clip, based on criteria of:
      whether the licensee has defined more than a threshold number of clips for access by parties other than the licensee based on a rights definition in the data store that identifies the threshold number of clips; and
      whether the media content clip for access by parties other than the licensee is greater than a threshold length based on a rights definition in the data store that identifies the threshold length; and
      whether the media content clip for access by parties other than the licensee includes a predetermined portion of the media content based on a rights definition in the data store that identifies the predetermined portion that is not permitted to be included in a permitted media content clip;
   when the determining concludes that the licensee is permitted to distribute the clip:
      storing, by the system, a definition of the media content clip in the clip rights enabler data store; and
      automatically transmitting, by the system, over the network a link from the clip rights enabler data store to a plurality of pre-identified third party users by which a third party requesting user is provided access to the media content clip according to the definition, wherein the third party requesting user is provided access by accessing, over the network, the clip rights enabler data store of the server system to access the definition of the media content clip and providing the media content clip to the third party requesting user according to the definition, such that the third party requesting user is provided access over the network to only the portion of the video between the starting point and the ending point; and
   after the determining, receiving, by the system, an instruction from a licensor of the media content to adjust the rights definitions contained in the rights enabler data store;
   adjusting, by the system, the rights definitions contained in the rights enabler data store in accordance with the received instruction from the licensor;
   receiving, by the system, from the licensee, over the network, another starting point within the media content and another ending point within the media content to define another media content clip located between said another starting point and another ending point; and
   determining, by the system, based on adjusted rights definitions contained in the rights enabler data store whether the licensee is permitted to distribute said another media content clip based on the criteria.

2. The method of claim 1, wherein the media content is video content, audio content, image content, or mixed media content.

3. The method of claim 1, wherein the media content is video content and the media content clip is a video clip.

4. The method of claim 3, wherein the requesting user is only provided access to the portion of the video between the starting point and the ending point.

5. The method of claim 3, wherein the requesting user is prevented from accessing the video outside of the range spanning the starting point to the ending point.

6. The method of claim 1, wherein the link is provided by the system to the licensee to forward to the requesting user.

7. The method of claim 3, wherein the licensee identifies the requesting user and any other users who are to be granted permission to view the video clip.

8. The method of claim 7, wherein the link is automatically forwarded to the requesting user and the other identified users after the video clip is defined.

9. The method of claim 3, wherein the licensee is a creator of the video.

10. The method of claim 3, further comprising:
   receiving an identification of the licensee; and determining whether the licensee has sufficient permission to define the video clip of the video.

11. The method of claim 1, wherein the licensee is an instructor and the requesting user is a student or other recipient of information from the instructor.

12. The method of claim 3, wherein the licensee is a purchaser of the video or other party having rights to modify the video.

13. The method of claim 12, wherein the other party receives a right to modify the video from another party having rights to modify the video via a delegation or license.

14. The method of claim 1, wherein providing the link includes uploading the link to a social media site.

15. The method of claim 3, further comprising:
receiving clip authoring permissions from a licensor, wherein the video clip defined by the licensee must conform to the clip authoring permissions.

16. The method of claim 15, wherein the clip authoring permissions identify a portion of the video from which the video clip may be defined.

17. The method of claim 15, wherein the clip authoring permissions identify a portion of the video from which the video clip may not be defined.

18. The method of claim 15, wherein the clip authoring permissions identify a maximum length of the video clip or a maximum number of video clips of the video that may be defined by the licensee.

19. The method of claim 15, wherein the clip authoring permissions identify licensees who are permitted to defined video clips.

20. The method of claim 15, wherein the clip authoring permissions are selectively adjusted by the licensor.

21. The method of claim 20, wherein a selective adjustment removes a restriction prohibiting definition of the video clip during a predefined portion of the video.

22. The method of claim 20, wherein the clip authoring permissions are selectively adjusted by the licensor or licensee based on performance of a required action by the licensee or other party.

23. The method of claim 22, wherein the required action is payment of a fee.

24. The method of claim 1, further comprising:
receiving an annotation to the video clip from the licensee that is permissible according to permissions for the system in the rights enabler data store, wherein the annotation is displayed with the video clip when the video clip is accessed by the requesting user.

25. The method of claim 1, further comprising:
displaying the video clip upon selection of the link by the requesting user.

26. The method of claim 1, further comprising:
receiving the link at a video player;
accessing the media content by the video player including a portion of the media content that is not within the media content clip;
displaying the media content clip to the requesting user using the video player, wherein the requesting user is prevented from accessing the media content outside of the range spanning the starting point to the ending point.

27. The method of claim 1, wherein the definition of the media content clip stored at the clip rights enabler data store includes the identification of the media content, the starting point of the clip, and the ending point of the clip.

28. The method of claim 1, wherein the clip rights enabler data store is remote from the licensee, and wherein the clip rights enabler data store contains data indicating rights of a plurality of licensees for the identified media content, wherein the clip rights enabler data store contains data indicating how many clips of the identified media content that the licensee has defined.

29. The method of claim 1, wherein the clip rights enabler data store further contains data indicating the threshold number of clips, the threshold length, and the predetermined portion associated with the licensee and the media content.

30. A server system for providing access to a portion of a video to a requesting user, comprising:
one or more data processors;
one or more computer-readable memories encoded with instructions for commanding the one or more data processors to execute steps that include:
providing, by the server system comprising one or more hardware servers using the one or more data processors, over a network a media content to a licensee that is granted permission to define media content clips from the media content;
receiving, at the system, from the licensee, over the network, a starting point within the media content and an ending point within the media content to define a media content clip located between the stalling point and the ending point; and
determining, by the system, based on rights definitions contained in a rights enabler data store of the system whether the licensee is permitted to distribute the media content clip, based on criteria of:
whether the licensee has defined more than a threshold number of clips for access by parties other than the licensee based on a rights definition in the data store that identifies the threshold number of clips;
whether the media content clip for access by parties other than the licensee is greater than a threshold length based on a rights definition in the data store that identities the threshold length; and
whether the media content clip for access by parties other than the licensee includes a predetermined portion of the media content based on a rights definition in the data store that identifies the predetermined portion that is not permitted to be included in a permitted media content clip;
when the determination concludes that the licensee is permitted to distribute the clip:
storing, by the system, a definition of the media content clip in the clip rights enabler data store; and
automatically transmitting, by the system, over the network, a link from the clip rights enabler data store to a plurality of pre-identified third party users by which a third party requesting user is provided access, over the network, to the media content clip according to the definition, wherein the third party requesting user is provided access by accessing the clip rights enabler data store to access the definition of the media content clip and providing the media content clip to the third party requesting user according to the definition, such that the third party requesting user is provided access over the network to only the portion of the video between the starting point and the ending point; and
after the determining, receiving, by the system, an instruction from a licensor of the media content to adjust the rights definitions contained in the rights enabler data store;
adjusting, by the system, the rights definitions contained in the rights enabler data store in accordance with the received instruction from the licensor;

receiving, by the system, from the licensee, over the network, another starting point within the media content and another ending point within the media content to define another media content clip located between said another starting point and another ending point; and determining, by the system, based on adjusted rights definitions contained in the rights enabler data store whether the licensee is permitted to distribute said another media content clip based on the criteria.

31. One or more non-transitory computer-readable memories encoded with instructions for commanding one or more data processors to execute steps that include:

providing, by a server system comprising one or more hardware servers using one or more data processors; over a network, a media content to a licensee that is granted permission to define media content clips from the media content;

receiving, at the system, from the licensee, over the network, a starting point within the media content and an ending point within the media content to define a media content clip located between the starting point and the ending point; and determining, by the system, based on rights definitions contained in a rights enabler data store of the system whether the licensee is permitted to distribute the media content clip, based on criteria of:

whether the licensee has defined more than a threshold number of clips for access by parties other than the licensee based on a rights definition in the data store that identifies the threshold number of clips;

whether the media content clip for access by parties other than the licensee is greater than a threshold length based on a rights definition in the data store that identifies the threshold length; and whether the media content clip for access by parties other than the licensee includes a predetermined portion of the media content based on a rights definition in the data store that identifies the predetermined portion that is not permitted to be included in a permitted media content clip;

when the determination concludes that the licensee is permitted to distribute the clip:

storing, by the system, a definition of the media content clip in the clip rights enabler data store; and automatically transmitting, by the system, over the network, a link from the clip rights enabler data store to a plurality of pre-identified third party users by which a third party requesting user is provided access over the network to the media content clip according to the definition, wherein the third party requesting user is provided access by accessing the clip rights enabler data store to access the definition of the media content clip and providing the media content clip to the third party requesting user according to the definition, such that the third party requesting user is provided access over the network to only the portion of the video between the starting point and the ending point; and after the determining, receiving, by the system, an instruction from a licensor of the media content to adjust the rights definitions contained in the rights enabler data store;

adjusting, by the system, the rights definitions contained in the rights enabler data store in accordance with the received instruction from the licensor;

receiving, by the system, from the licensee, over the network, another starting point within the media content and another ending point within the media content to define another media content clip located between said another starting point and another ending point; and determining, by the system, based on adjusted rights definitions contained in the rights enabler data store whether the licensee is permitted to distribute said another media content clip based on the criteria.

* * * * *